(12) United States Patent
Wang et al.

(10) Patent No.: US 12,383,092 B2
(45) Date of Patent: Aug. 12, 2025

(54) ANTI-DEFLECTION MOCHA POT

(71) Applicant: ZHEJIANG SEECIN HOUSEWARES CORP, Yongkang (CN)

(72) Inventors: Loujun Wang, Yongkang (CN); Zhongxian Hu, Yongkang (CN)

( * ) Notice: Subject to any disclaimer, the term of this patent is extended or adjusted under 35 U.S.C. 154(b) by 799 days.

(21) Appl. No.: 17/575,666

(22) Filed: Jan. 14, 2022

(65) Prior Publication Data

US 2022/0133076 A1    May 5, 2022

(30) Foreign Application Priority Data

Sep. 6, 2021    (CN) .......................... 202122132455.7

(51) Int. Cl.
*A47J 31/44* (2006.01)
*A47J 31/36* (2006.01)

(52) U.S. Cl.
CPC ....... *A47J 31/4403* (2013.01); *A47J 31/3666* (2013.01)

(58) Field of Classification Search
CPC .......... A47J 31/00; A47J 31/34; A47J 27/002; A47J 36/16; A47J 27/04; A47J 27/12; A47J 2201/00; A47J 2027/043; A47J 27/004; A47J 31/306; A47J 31/303; A47J 31/30; A47J 31/4403; A47J 31/3666; F16J 15/022
USPC .......................................................... 99/279
See application file for complete search history.

(56) References Cited

U.S. PATENT DOCUMENTS

2006/0249035 A1    11/2006    Lin
2007/0272086 A1    11/2007    Ancona
2011/0132938 A1     6/2011    Musselman et al.

FOREIGN PATENT DOCUMENTS

EP            0024357 A1 *  3/1981

* cited by examiner

*Primary Examiner* — Helena Kosanovic
*Assistant Examiner* — Shruti Shree Sharma
(74) *Attorney, Agent, or Firm* — Hemisphere Law, PLLC; Zhigang Ma

(57) ABSTRACT

The present disclosure relates to the technical field of mocha pot and discloses an anti-deflection mocha pot, which includes an upper pot. The upper pot includes a pot body and a base. The pot body is through from top to bottom, and the bottom horizontally extends inwards with a convex ring. The base includes a base plate on a lower end surface of the convex ring, a press disc on an upper end surface of the convex ring and an anti-deflection locking mechanism locking the press disc and the base plate. The anti-deflection locking mechanism includes at least two sealing locking members circumferentially arranged at equal intervals around a center of the base plate. A good sealing effect is achieved on the pot body and base of the upper pot of the mocha pot, and the base is prevented from being deflected relative to the pot body.

8 Claims, 3 Drawing Sheets

ANTI-DEFLECTION MOCHA POT

TECHNICAL FIELD

The present disclosure relates to the technical field of mocha pots, and particularly to an anti-deflection mocha pot.

BACKGROUND

As a tool for extracting concentrated coffee, the mocha pot is in common use in European and Latin American countries and used now widely throughout the world. The mocha pot has a two-layer structure and includes an upper pot body and lower pot body which are arranged up and below. A gauze filter loaded with coffee powder is arranged in the lower pot body. Clear water is added into the lower pot body. After the clear water in the lower pot body is heated, water vapor is ejected into the upper pot body after passing through the gauze filter. A cup of coffee may be obtained by pouring the coffee liquid from the upper pot body.

The upper pot body of the existing mocha pot includes a pot main body and a base which are usually detachably arranged mostly using a threaded structure at present. For example, a well-sealed mocha pot disclosed in Chinese patent application No. CN212755299U includes an upper pot and a lower pot. The upper pot is through from top to bottom. A circular base is arranged at the bottom of the upper pot. A hollow threaded pipe having a thread outside extends from an upper end of the circular base into the upper pot. A cover plate in sleeve connection with the threaded pipe is arranged in the upper pot and locked by a locking cover.

The threaded pipe above is arranged at a central position of the circular base and may be loosened during later use after being tightened, leading to deflect the whole base relative to the upper pot; and even loosen the position between the threaded pipe and the locking cover, thereby unsealing the upper pot and causing coffee in the upper pot to flow back out of the mocha pot or into the lower pot.

SUMMARY

An objective of the present disclosure is to provide an anti-deflection mocha pot capable of avoiding a base being deflected, to solve the problem in the art that a base of an upper pot is in threaded connection fit with a pot body in the center and is easily deflected relative to the upper pot until loosening and unsealing to cause the leakage of coffee in the pot body.

In order to solve the foregoing technical problem, the present disclosure provides the following technical solution. An anti-deflection mocha pot includes an upper pot. The upper pot includes a pot body and a base. The pot body is through from top to bottom, and the bottom horizontally extends inwards with a convex ring. The base includes a base plate on a lower end surface of the convex ring, a press disc on an upper end surface of the convex ring and an anti-deflection locking mechanism locking the press disc and the base plate. A sealing structure is arranged between the press disc and the base plate on an inner ring wall of the convex ring. The anti-deflection locking mechanism includes at least two sealing locking members circumferentially arranged at equal intervals around a center of the base plate. Two ends of the sealing locking member are in sealing connection fit with the base plate and the press disc respectively and seal and press the base plate and the press disc on the upper and lower end surfaces of the convex ring respectively.

According to the above solution, the upper pot includes the pot body and the base. The base includes the press disc, the base plate and the anti-deflection locking mechanism locking the press disc and the base plate to the upper and lower end surfaces of the convex ring at the bottom of the pot body. Sealing is implemented by the sealing structure. The anti-deflection locking mechanism includes more than two sealing locking members eccentrically arranged on the press disc and the base plate. As such, the fit between the press disc and the base plate, between the press disc and the convex ring and between the base plate and the convex ring may be effectively prevented from being loosened by the deflection of the press disc and the base plate, and high sealing performance may be kept at fitting positions of the press disc, the base plate and the convex ring.

Further, the sealing structure is an elastic sealing ring connected to the inner ring wall of the convex ring in an interference clamping manner. Extending ring edges elastically abutting against the upper and lower end surfaces of the convex ring horizontally extend outwards from upper and lower end surfaces of the elastic sealing ring respectively. Both a lower end surface of the press disc and an upper end surface of the base plate are in elastic abutting fit with the extending ring edges.

According to the above solution, the elastic sealing ring may seal a fit clearance between the inner ring wall of the convex ring and the press disc and the base plate, and the extending ring edge is used to seal fit clearances between the upper and lower end surfaces of the convex ring and the press disc or the base plate. The sealing effects of the two may be combined to ensure that the pot body and the base are sealed well.

Further, the sealing locking member includes a locking member locking the base plate and the press disc and a sealing member avoiding liquid in the pot body entering a bottom of the press disc.

According to the above solution, the locking member is used to lock the base plate and the press disc and the pot body by fitting, and the sealing member is used to seal fit clearances between the locking member and the press disc and between the locking member and the base plate. Therefore, the pot body and the base are kept in a sealed state.

Further, the locking member is a rivet penetrating through and locking the press disc and the base plate. A matching hole through which the rivet penetrates in an interference manner is formed in the press disc.

Further, the locking member is a locking screw penetrating through and locking the press disc and the base plate. A threaded pipe with an inner threaded hole and in fit with the locking screw extends upwards or downwards from the press disc.

Further, the sealing member is a first sealing ring arranged on an upper end surface of the press disc or between the press disc and the base plate. When the first sealing ring is arranged on the upper end surface of the press disc, the first sealing ring is in interference fit with the locking member, and a bottom thereof elastically abuts against the upper end surface of the press disc. When the first sealing ring is arranged between the press disc and the base plate, the first sealing ring is in interference fit with the locking member, and upper and lower end surfaces thereof elastically abut against a bottom of the press disc and an upper end of the base plate respectively.

According to the above solution, when the first sealing ring is arranged on the press disc or between the press disc and the base plate, a fitting position of the press disc and the locking member may be sealed, thereby avoiding liquid in the pot body leaking to be below the press disc.

Further, a hiding plate hiding the locking member is arranged at an upper end of the press disc. An outer ring surface of the hiding plate is bent downwards to form a bent ring wrapping an outer ring wall of the press disc.

According to the above solution, the hiding plate may hide the locking member and simultaneously further improve the sealing performance of the press disc.

Further, a liquid outlet pipe extending into the pot body is detachably fixed to the base. An elastic clamping block is arranged between the press disc and the base plate and in elastic abutting fit with the both simultaneously. The liquid outlet pipe elastically penetrates with the base plate in an interference manner after through the press disc and the base plate. The liquid outlet pipe is in insertion fit with the base plate after sequentially penetrating through the press disc and the elastic clamping block.

According to the above solution, the arrangement of the elastic clamping block implements the detachable fit between the liquid outlet pipe and the base and simultaneously ensures the sealing at the fitting position.

Compared with the conventional art, the present disclosure has the following beneficial effects:
1. the upper pot includes the pot body and the base. The base includes the press disc, the base plate and the anti-deflection locking mechanism locking the press disc and the base plate to the upper and lower end surfaces of the convex ring at the bottom of the pot body. Sealing is implemented by the sealing structure. The anti-deflection locking mechanism includes more than two sealing locking members eccentrically arranged on the press disc and the base plate. As such, the fit between the press disc and the base plate, between the press disc and the convex ring and between the base plate and the convex ring may be effectively prevented from being loosened by the deflection of the press disc and the base plate, and high sealing performance may be kept at fitting positions of the press disc, the base plate and the convex ring; and
2. the sealing locking member includes the locking member and the sealing member.

The locking member is used to lock each of the base plate and the press disc and the pot body by fitting, and the sealing member is used to seal a fit clearance between the locking member and the press disc and the base plate. Therefore, the pot body and the base are kept in a sealed state.

In summary, a good sealing effect is achieved on the pot body and base of the upper pot of the mocha pot, and the base is prevented from being deflected relative to the pot body.

BRIEF DESCRIPTION OF THE DRAWINGS

The drawings, which constitute a part of the specification, are used to provide a further understanding to the present disclosure and explain, together with embodiments of the present disclosure, the present disclosure and not intended to form limits to the present disclosure. In the drawings.

Figure 1:
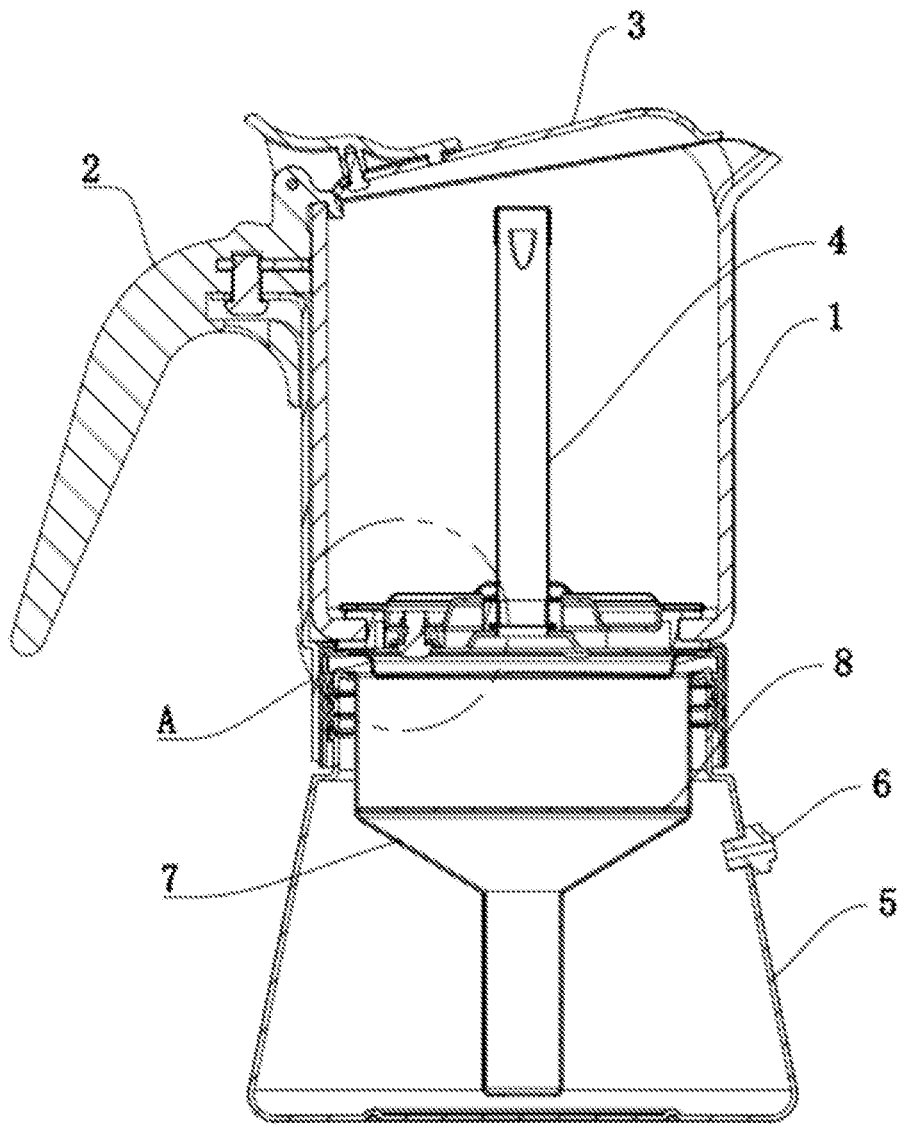
FIG. 1 is a sectional view of an anti-deflection mocha pot according to embodiment 1.

In the drawings: 1—pot body; 2—pot handle; 3—pot lid; 4—liquid outlet pipe; 401—clamping ring; 5—lower pot; 6—pressure relief valve; 7—funnel; 8—filter sheet; 9—convex ring; 10—elastic sealing ring; 11—extending ring edge; 12—press disc; 13—hiding plate; 14—rivet; 15—first sealing ring; 16—matching hole; 17—base plate; 18—second sealing ring; 19—elastic clamping block; 20—annular clamping groove; 21—locking screw; and 22—threaded pipe.

DESCRIPTION OF THE EMBODIMENTS

The technical solutions in the embodiments of the present disclosure will be described clearly and completely below in combination with the drawings in the embodiments of the present disclosure.

Embodiment 1

Figure 2:
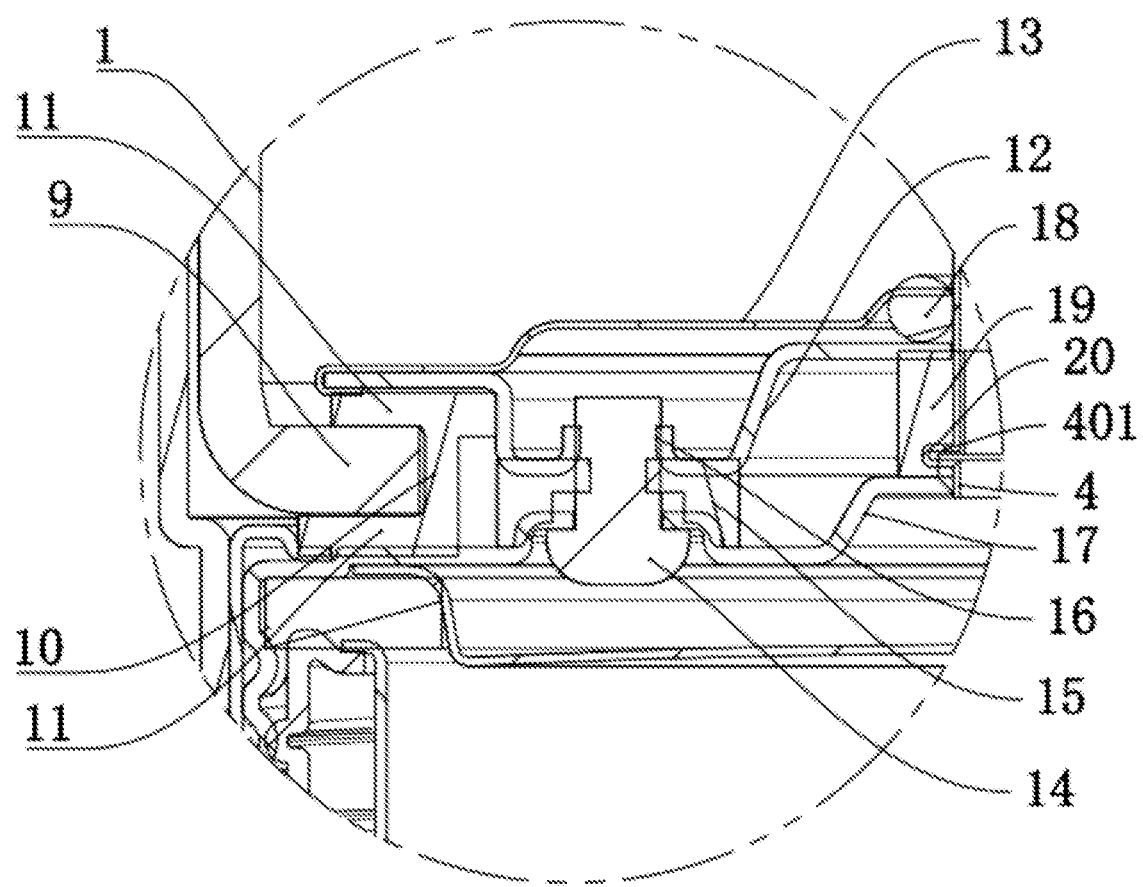
FIG. 2 is an enlarged view of part A in FIG. 1.

Referring to FIGS. 1 to 2, an anti-deflection mocha pot includes an upper pot and a lower pot 5. The upper pot includes a pot body 1 and a base. The pot body 1 is arranged through from top to bottom. A pot handle 2 is arranged on an outer wall of the pot body 1. A pot lid 3 capable of uncovering or covering an opening in an upper end of the pot body 1 is hinged to an upper end of the pot handle 2. The base is arranged at a lower end of the pot body 1 and configured to seal the pot body 1. A liquid flowing hole is formed in the base. A liquid outlet pipe 4 extending into the pot body 1 is fixed to the liquid flowing hole. A funnel 7 configured to place coffee powder is arranged in the lower pot 5. A filter sheet 8 is arranged in the funnel 7. The coffee powder is placed above the filter sheet 8. A pressure relief valve 6 is arranged on an outer wall of the lower pot 5. After the lower pot 5 is heated, water vapor in the lower pot 5 dissolves the coffee powder after passing through the funnel 7 to form coffee liquid. The coffee liquid is spurted into the pot body 1 through the liquid outlet pipe 4.

In order to avoid the base being deflected relative to the pot body 1, the bottom of the pot body 1 horizontally extends inwards with a convex ring 9. The base includes a base plate 17 on a lower end surface of the convex ring 9 and a press disc 12 on an upper end surface of the convex ring 9. An anti-deflection locking mechanism locking the press disc 12 and the base plate 17 is arranged therebetween. In order to ensure the sealing performance of the pot body 1, a sealing structure is arranged between the press disc 12 and the base plate 17 on an inner ring wall of the convex ring 9.

The sealing structure is an elastic sealing ring 10 connected to the inner ring wall of the convex ring 9 in an interference clamping manner. The elastic sealing ring 10 is made of high-temperature resistant rubber. Extending ring edges 11 elastically abutting against the upper and lower end surfaces of the convex ring 9 horizontally extend outwards from upper and lower end surfaces of the elastic sealing ring 10 respectively. Both a lower end surface of the press disc 12 and an upper end surface of the base plate 17 are in elastic abutting fit with the extending ring edges 11. Therefore, sealing fit is formed between the press disc 12, the base plate 17 and the pot body 1.

The anti-deflection locking mechanism includes at least two sealing locking members circumferentially arranged at equal intervals around a center of the base plate 17. In the present embodiment, three sealing locking members are arranged. Two ends of the sealing locking member are in sealing connection fit with the base plate 17 and the press disc 12 respectively and seal and press the base plate 17 and the press disc 12 on the elastic sealing ring 10. The sealing locking member includes a locking member and a sealing member avoiding liquid in the pot body entering a bottom of the press disc 12. The locking member is a rivet 14 penetrating through and locking the base plate 17 and the press disc 12. A first through hole through which the rivet 14 may penetrate is formed in the base plate 17. A matching hole 16 through which the rivet 14 penetrates in an interference manner is formed in the press disc 12. The rivet 14 is in interference insertion fit with the matching hole 16 after penetrating through the first through hole. The sealing member is a first sealing ring 15 arranged on an upper end surface of the press disc 12 or between the press disc 12 and the base plate 17. The first sealing ring 15 is made of high-temperature resistant rubber or silica gel. When the first sealing ring 15 is arranged on the upper end surface of the press disc 12, the first sealing ring 15 is in interference fit with the rivet 14, and a bottom thereof elastically abuts against the upper end surface of the press disc 12. When the first sealing ring 15 is arranged between the press disc 12 and the base plate 17, the first sealing ring 15 is in interference fit with the rivet 14, and upper and lower end surfaces thereof elastically abut against a bottom of the press disc 12 and an upper end of the base plate 17 respectively. In the present embodiment, the latter arrangement is adopted, namely the first sealing ring 15 is arranged between the press disc 12 and the base plate 17. Sealing may be implemented at the same time between the press disc 12, the base plate 17 and the rivet 14 to completely eradicate the risk that liquid in the pot body 1 leaks downwards through the base plate 17 and achieve higher sealing performance.

In order to improve the aesthetic appeal and the sealing performance, a hiding plate 13 hiding the rivet 14 is arranged at an upper end of the press disc 12. An outer ring of the hiding plate 13 is bent downwards to form a bent ring wrapping an outer ring wall of the press disc 12. A lower end surface of the bent ring is in elastic abutting fit with the extending ring edge 11 of the elastic sealing ring 10. The sealing performance is further improved at the same time of hiding the rivet 14.

For the ease of cleaning, a filter pipe is detachably arranged on the base. Specifically, an elastic clamping block 19 is arranged between the press disc 12 and the base plate 17. Upper and lower end surfaces of the elastic clamping block 19 elastically abut against the bottom of the press disc 12 and the upper end of the base plate 17 respectively. In the present embodiment, a liquid outlet is a second through hole which corresponds one to one from top to bottom in the hiding plate 13, the press disc 12 and the base plate 17 and through which a liquid outlet pipe 4 may penetrate. The elastic clamping block 19 has a clamping hole through which the liquid outlet pipe 4 may penetrate in an interference manner. The elastic clamping block 19 is larger than the second through hole. The liquid outlet pipe 4 is in insertion fit with the second through hole in the base plate 17 after sequentially penetrating through the second through holes in the hiding plate 13 and the press disc 12 and the clamping hole. In order to improve the sealing performance, a second sealing ring 18 is in interference fit with the liquid outlet pipe 4 in the hiding plate 13. Upper and lower end surfaces of the second sealing ring 18 are in elastic abutting fit with the lower end surface of the hiding plate 13 and the upper end surface of the press disc 12 respectively. In order to improve the clamping firmness, an annular clamping groove 20 is sunken into an inner ring wall of the clamping hole. A clamping ring 401 that may be clamped into the annular clamping groove 20 protrudes from a lower end of an outer ring wall of the liquid outlet pipe 4.

The upper pot is assembled by the following steps:

Step 1, the hiding plate 13 and the press disc 12 are riveted together for fixation by a machine, and the second sealing ring 18 is arranged therebetween and aligned with the second through holes in the hiding plate 13 and the press disc 12.

Step 2, the elastic sealing ring 10 is clamped into the convex ring 9.

Step 3, the liquid outlet pipe 4 is caused to penetrate through the second sealing ring 18, and then the elastic clamping ring 401 is clamped into the liquid outlet pipe 4 until the annular clamping groove 20 in the elastic clamping ring 401 is clamped with the clamping ring 401 on the liquid outlet pipe.

Step 4, three rivets 14 are caused to sequentially penetrate through the base plate 17 from bottom to top, and the first sealing ring 15 is sequentially connected to the rivets 14 in a sleeving manner.

Step 5, the press disc 12 is placed on the upper end surface of the convex ring 9, and then the base plate 17 is placed at the lower end of the convex ring 9. First, insertion fit is formed between the second through holes in the liquid outlet pipe 4 and the base plate 17 for positioning, and then the rivets 14 are sequentially inserted into the matching hole 16 in the press disc 12 in an interference manner and pressed, thereby elastically pressing both the press disc 12 and the base plate 17 to the extending ring edges 11 of the elastic sealing ring 10 to be sealed and fixed.

According to the above-mentioned structure, the base may be effectively prevented from being deflected relative to the pot body 1, and meanwhile, the sealing performance between the base and the pot body 1 may be ensured to avoid the leakage of the coffee liquid in the pot body 1.

Embodiment 2

Figure 3:
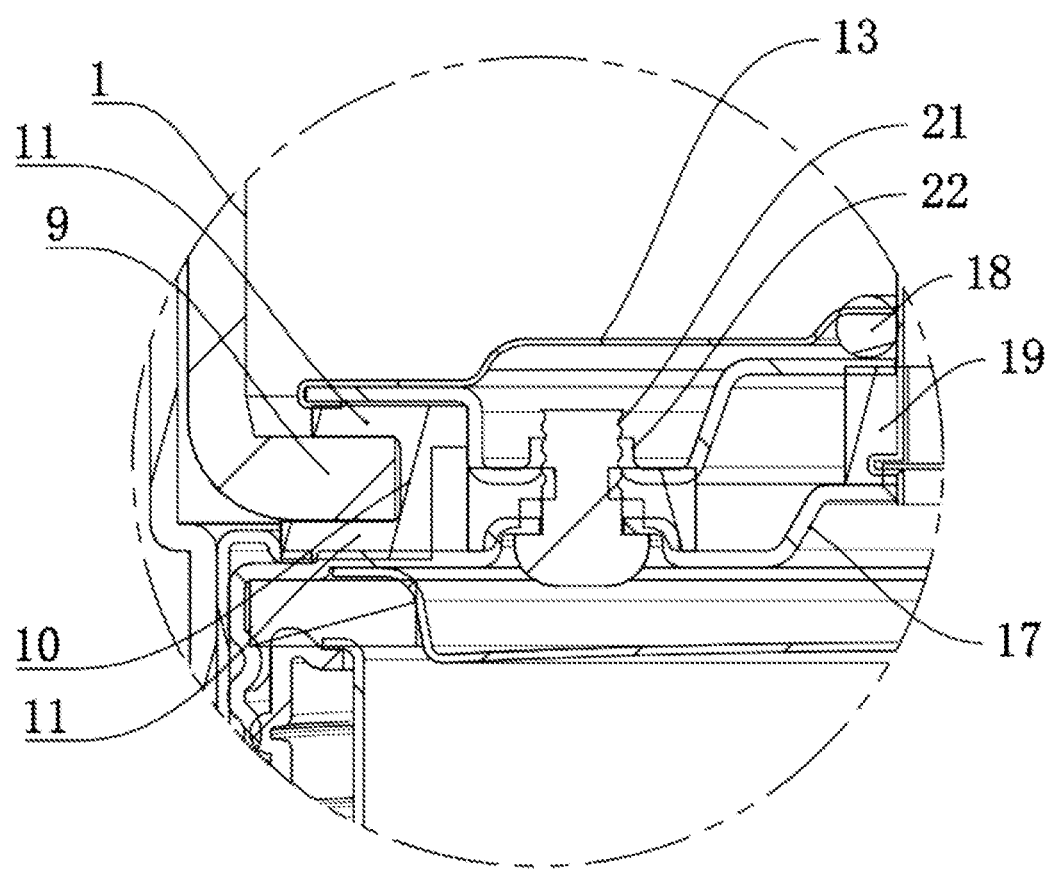
FIG. 3 is a partial sectional view when a pot body is in fit with a base according to embodiment 2.

The present embodiment differs from embodiment 1 as follows. Referring to FIG. 3, the locking member is a locking screw 21 penetrating through and locking the base plate 17 and the press disc 12. A threaded pipe 22 with an internal thread and in fit with the locking screw 21 extends upwards or downwards from the press disc 12. In the present embodiment, the threaded pipe 22 is arranged on the press disc 12 in a manner of extending upwards. Compared with embodiment 1, the locking screw 21 makes it convenient to dismount the press disc 12 and the base plate 17.

It is to be finally noted that the above is only the preferred embodiment of the present disclosure and not intended to limit the present disclosure. Although the present disclosure has been described in detail with reference to the foregoing embodiments, those skilled in the art may still make modifications to the technical solutions described in each of the foregoing embodiments or make equivalent replacements to some technical features in the technical solutions. Any modifications, equivalent replacements, improvements and the like made within the spirit and principle of the present disclosure shall fall within the scope of protection of the present disclosure.

What is claimed is:

1. An anti-deflection mocha pot, comprising an upper pot, the upper pot comprising a pot body (1) and a base, wherein the pot body (1) is through from top to bottom, and the bottom horizontally extends inwards with a convex ring (9); the base comprises a base plate (17) on a lower end surface of the convex ring (9), a press disc (12) on an upper end surface of the convex ring (9) and an anti-deflection locking mechanism locking the press disc (12) and the base plate (17); a sealing structure is arranged between the press disc (12) and the base plate (17) on an inner ring wall of the convex ring (9); the anti-deflection locking mechanism comprises at least two sealing locking members circumferentially arranged at equal intervals around a center of the base plate (17); and two ends of the sealing locking member are in sealing connection fit with the base plate (17) and the press disc (12) respectively, and seal and press the base plate (17) and the press disc (12) on the upper and lower end surfaces of the convex ring (9) respectively.

2. The anti-deflection mocha pot according to claim 1, wherein the sealing structure is an elastic sealing ring (10) connected to the inner ring wall of the convex ring (9) in an interference clamping manner; an extending ring edge (11) elastically abutting against the upper and lower end surfaces of the convex ring (9) horizontally extend outwards from upper and lower end surfaces of the elastic sealing ring (10) respectively; and both a lower end surface of the press disc (12) and an upper end surface of the base plate (17) are in elastic abutting fit with the extending ring edge (11).

3. The anti-deflection mocha pot according to claim 1, wherein the sealing locking member comprises a locking member locking the base plate (17) and the press disc (12) and a sealing member avoiding liquid in the pot body (1) entering a bottom of the press disc (12).

4. The anti-deflection mocha pot according to claim 3, wherein the locking member is a rivet (14) penetrating through and locking the base plate (17) and the press disc (12); and a matching hole (16) through which the rivet (14) penetrates in an interference manner is formed in the press disc (12).

5. The anti-deflection mocha pot according to claim 3, wherein the locking member is a locking screw (21) penetrating through and locking the base plate (17) and the press disc (12); and a threaded pipe (22) with an inner threaded hole and in fit with the locking screw (21) extending upwards or downwards on the press disc (12).

6. The anti-deflection mocha pot according to claim 3, wherein the sealing member is a first sealing ring (15) arranged on an upper end surface of the press disc (12) or between the press disc (12) and the base plate (17); when the first sealing ring (15) is arranged on the upper end surface of the press disc (12), the first sealing ring (15) is in interference fit with the locking member, and a bottom thereof elastically abuts against the upper end surface of the press disc (12); and when the first sealing ring (15) is arranged between the press disc (12) and the base plate (17), the first sealing ring (15) is in interference fit with the locking member, and an upper end surface and a lower end surface of the first sealing ring (15) elastically abut against the bottom of the press disc (12) and an upper end of the base plate (17) respectively.

7. The anti-deflection mocha pot according to claim 4, wherein a hiding plate (13) hiding the locking member is arranged at an upper end of the press disc (12); and an outer ring surface of the hiding plate (13) is bent downwards to form a bent ring wrapping an outer ring wall of the press disc (12).

8. The anti-deflection mocha pot according to claim 7, wherein a liquid outlet pipe (4) extending into the pot body (1) is detachably fixed to the base; an elastic clamping block (19) which is in elastic abutting fit with both the press disc and the base plate and through which the liquid outlet pipe (4) elastically penetrates in an interference manner is arranged between the press disc (12) and the base plate (17); and the liquid outlet pipe (4) is in insertion fit with the base plate (17) after sequentially penetrating through the press disc (12) and the elastic clamping block (19).

\* \* \* \* \*